United States Patent [19]
McMahan et al.

[11] Patent Number: 5,461,666
[45] Date of Patent: Oct. 24, 1995

[54] SYSTEM AND METHOD FOR CONFIGURING A TELEPHONE

[75] Inventors: Michael L. McMahan, Plano; Michele B. Gammel, Farmers Branch, both of Tex.

[73] Assignee: Texas Instruments Incorporated, Dallas, Tex.

[21] Appl. No.: 289,481

[22] Filed: Aug. 11, 1994

Related U.S. Application Data

[63] Continuation of Ser. No. 923,061, Jul. 31, 1992, Pat. No. 5,402,477.

[51] Int. Cl.$^6$ .............................. H04M 3/42; H04M 1/64
[52] U.S. Cl. .............................. 379/67; 379/96; 379/157; 379/201
[58] Field of Search ..................... 379/1, 10, 27, 379/96, 157, 164, 165, 201, 354, 357, 142, 67

[56] References Cited

U.S. PATENT DOCUMENTS

| | | | |
|---|---|---|---|
| 4,591,671 | 5/1986 | Pinede et al. | 379/27 |
| 4,644,107 | 2/1987 | Clowes et al. | 379/354 |
| 4,656,651 | 4/1987 | Evans et al. | 379/1 |
| 4,707,848 | 11/1987 | Durston et al. | 379/1 |
| 4,785,408 | 11/1988 | Britton et al. | 379/88 |
| 4,788,720 | 11/1988 | Brennan et al. | 379/354 |
| 4,817,132 | 3/1989 | Chamberlin et al. | 379/201 |
| 4,928,302 | 5/1990 | Kaneuchi et al. | 379/357 |
| 4,928,306 | 5/1990 | Biswas | 379/201 |
| 5,105,438 | 4/1992 | Ackroff et al. | 379/360 |
| 5,119,413 | 6/1992 | Okumura et al. | 379/201 |
| 5,241,580 | 8/1993 | Babson, III | 379/10 |
| 5,283,818 | 2/1994 | Klausner et al. | 379/142 |
| 5,309,509 | 5/1994 | Cocklin et al. | 379/201 |

OTHER PUBLICATIONS

Matsuo et al. "Personal Telephone Service Using IC-Cards" IEEE Communications Magazine, Jul. 1989, pp. 41–48.
Hsing et al, "An Interactive Touch Phone for Office Automation," IEEE Communications Magazine, Feb. 1985 vol. 23 No. 2 pp. 21–26.
"Terminal System System 24", Telephony, 11 Nov. 1988 pp. 40–41.
"Smart Phones" Popular Science, Nov. 1990 p. 47.

*Primary Examiner*—Jeffery A. Hofsass
*Assistant Examiner*—Daniel S. Hunter
*Attorney, Agent, or Firm*—Tammy L. Williams; Richard L. Donaldson

[57] ABSTRACT

A method and system are provided for configuring a telephone (10). A connection (20) is formed between the telephone (10) and a telephone environment (60). A list of services offerable through at least one type of telephone environment is generated (100). A list of candidate procedures for establishing each listed service through the telephone environment is generated (102). Ones of the listed procedures are executed (104) to determine whether each listed service is supported by the connection (20).

7 Claims, 5 Drawing Sheets

SYSTEM AND METHOD FOR CONFIGURING A TELEPHONE

This is a continuation of application Ser. No. 07/923,061, filed Jul. 31, 1992, U.S. Pat. No. 5,402,477.

TECHNICAL FIELD OF THE INVENTION

This invention relates in general to communication systems and in particular to a method and system for configuring a telephone.

BACKGROUND OF THE INVENTION

Typical business and residential telephone systems are limited in the array of services which are offered to a telephone user. This shortcoming can be based on limitations (1) in the telephone instrument itself or (2) in the switching network to which the telephone instrument is connected. For example, some special services might not be supported by the switching network's software or hardware.

Even if a special service is supported by the switching network's software and hardware, a user normally establishes and accesses the special service (1) by using one or more preprogrammed control function keys of the telephone instrument or (2) by entering a touchtone command sequence through the telephone instrument's numeric keypad. Although a control function key usually is more convenient for the user than a touchtone command sequence, the telephone instrument might offer only a fixed array of such control function keys for establishing special services.

Moreover, previous techniques typically fail to automatically configure a telephone to offer the user only those services which are actually supported by the switching network. Instead, under previous techniques, the telephone is manually configured. Each time a service is modified or added to the system, the configuration is manually repeated.

Thus, a need has arisen for a method and system for configuring a telephone, in which a user establishes and accesses a special service by using one or more control function keys of the telephone. Also, a need has arisen for a method and system for configuring a telephone, in which the telephone offers a variable array of control function keys for establishing special services. Further, a need has arisen for a method and system for configuring a telephone, in which the telephone is automatically configured to offer the user only those services which are actually supported by the switching network.

SUMMARY OF THE INVENTION

In a first aspect of a method and system for configuring a telephone, a connection is formed between the telephone and a telephone environment. A list of services offerable through at least one type of telephone environment is generated. A list of candidate procedures for establishing each listed service through the telephone environment is generated. Ones of the listed procedures are executed to determine whether each listed service is supported by the connection.

In a second aspect of a method and system for configuring a telephone, multiple lines supportable by the telephone are determined. A number of the lines supported by the connection are determined in response to whether the telephone environment is responsive to a respective condition of each line.

In a third aspect of a method and system for configuring a telephone, a connection is formed through a telephone environment between the telephone and a device. Information is communicated from the device to the telephone. At least one function is provided on the telephone in response to the information, such that the telephone communicates additional information to the device in response to the function being selected.

It is a technical advantage of the present invention that a user establishes and accesses a special service by using one or more control function keys of the telephone.

It is another technical advantage of the present invention that the telephone offers a variable array of control function keys for establishing special services.

It is a further technical advantage of the present invention that the telephone is automatically configured to offer the user only those services which are actually supported by the switching network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1A:
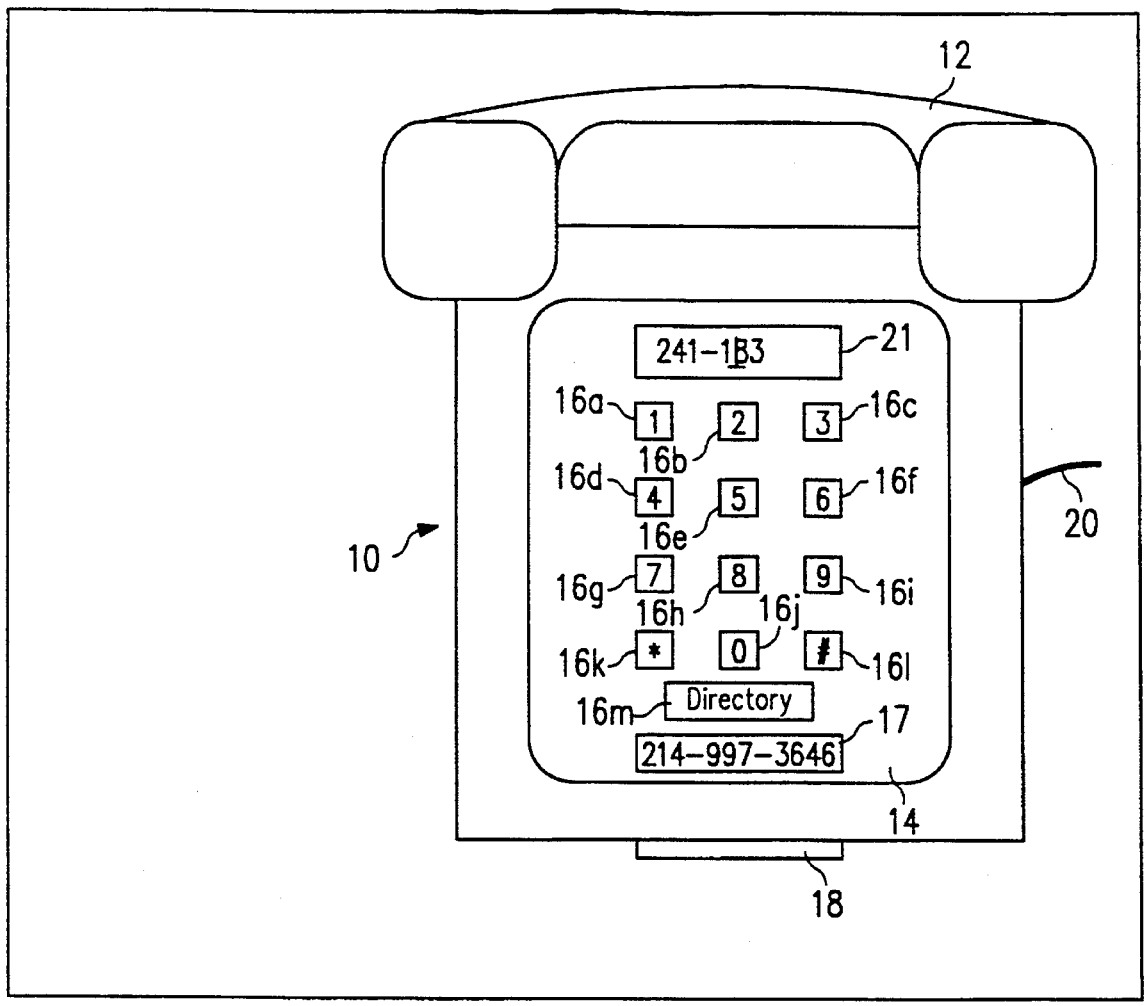
FIGS. 1a–c illustrate an exemplary programmable telephone.

FIG. 1a illustrates an exemplary programmable telephone, indicated generally at 10, which is programmable for a variety of applications. Telephone 10 inputs and outputs audio signals through an associated handset 12. Telephone 10 includes a touch screen 14 over an LCD display. Touch screen 14 includes defined regions 16a–m which function as simulated buttons. Region 17 displays a telephone number associated with telephone 10.

Telephone 10 further includes (1) a dual tone multi-frequency ("DTMF") signal generator and (2) speaker-independent speech recognition circuitry. Also, telephone 10 includes memory card circuitry for reading and writing to a removable memory card 18, such as a magnetic or optical storage card. Alternatively, telephone 10 can be connected to a peripheral device including such memory card circuitry.

In response to any of regions 16a–n being physically contacted, telephone 10 performs a specified function associated with the physically contacted region. As shown in FIG. 1a, regions 16a–l display twelve standard buttons of a traditional telephone. Telephone 10 outputs a DTMF signal on a network line 20 either in response to the user touching any of regions 16a–l, or in response to a digit orally specified by the user's voice into handset 12. A region 21 displays telephone number digits as associated DTMF signals are output by telephone 10.

Instead of orally specifying a digit, the user can engage in "spoken speed dialing", where the user specifies a receiving site by orally stating a phrase (e.g. "Call Home") into handset 12. In response to such a phrase, telephone 10 outputs a series of DTMF signals on network line 20. Such DTMF signals correspond to digits of the telephone number associated with the specified receiving site (e.g. "Home").

Figure 1B:
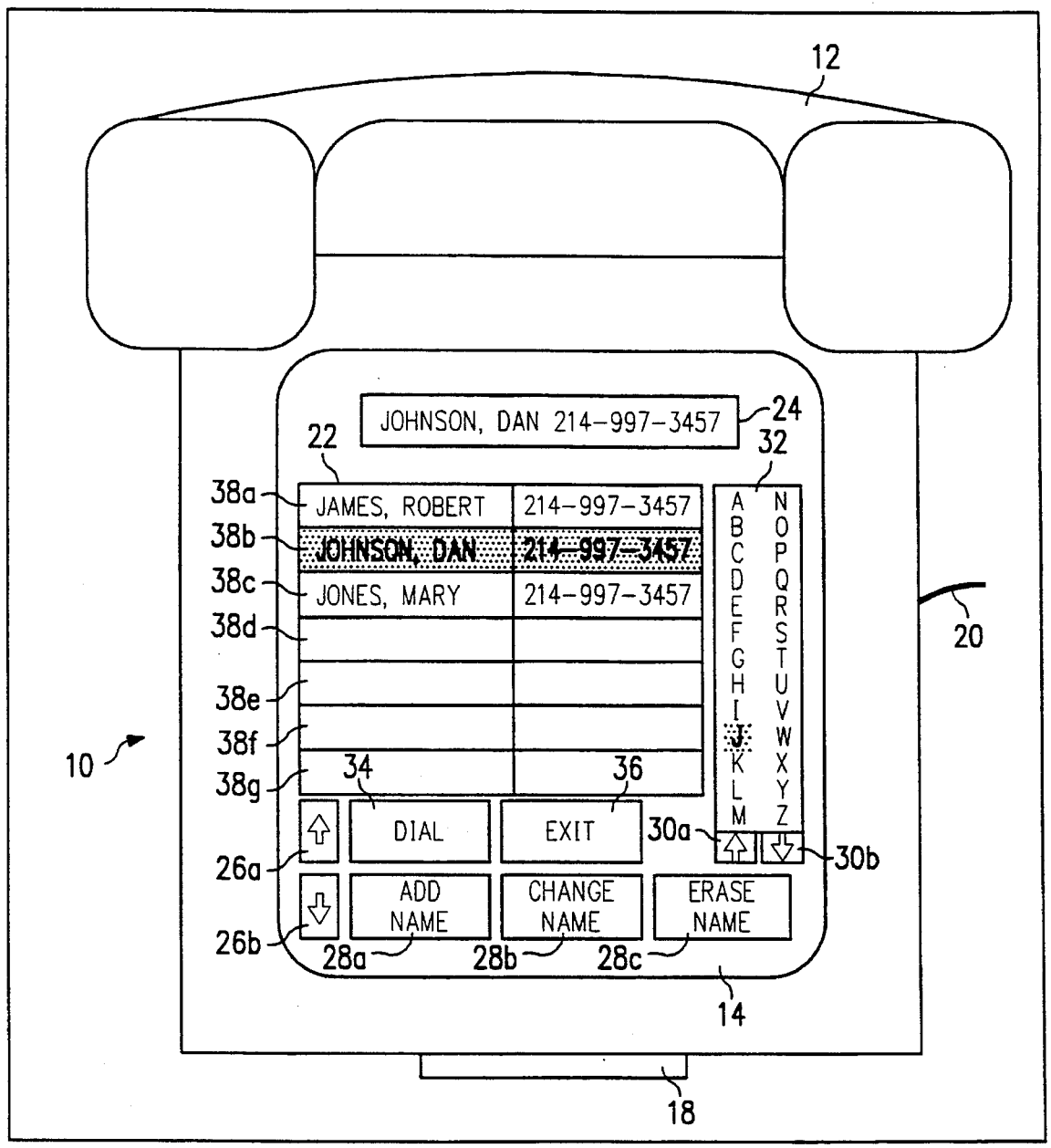

Accordingly, telephone 10 stores a directory of telephone numbers. Region 16m on screen 14 is defined as a "directory" button. In response to the user touching region 16m, the display of screen 14 changes to that shown in FIG. 1b. As shown in FIG. 1b, screen 14 includes regions 22, 24, 26a–b, 28a–c, 30a–b, 32, 34 and 36.

In fields 38a–g, region 22 displays a directory of names and associated telephone numbers stored by telephone 10, indexed under the highlighted letter "J" in region 32. Region 24 displays information from a highlighted field 38b of region 22. The user can change the highlighted field of region 22 to be any of fields 38a–g by selectively touching regions 26a–b in order to scroll through fields 38a–g. Alternatively, the user can change the highlighted field by directly touching a selected one of fields 38a–g in region 22.

Similarly, the user can change the highlighted letter in region 32 by selectively touching regions 30a–b in order to scroll through letters A–Z displayed in region 32. Alternatively, the user can change the highlighted letter in region 32 by directly touching a selected one of letters A–Z displayed in region 32. As another letter is highlighted, the display of names and associated telephone numbers in region 22 is updated to display the names and associated telephone numbers indexed under the highlighted letter.

By touching region 34 ("Dial"), the user dials the telephone number displayed in the highlighted field of region 22. By touching region 28c ("Erase Name"), the user erases the name and associated telephone number in the highlighted field of region 22. By touching region 28a ("Add Name"), the user can add a new name and associated telephone number to region 22 for storage in telephone 10. Similarly, by touching region 28b ("Change Name"), the user can change the name or associated telephone number in the highlighted field of region 22.

Figures 1C, 2:
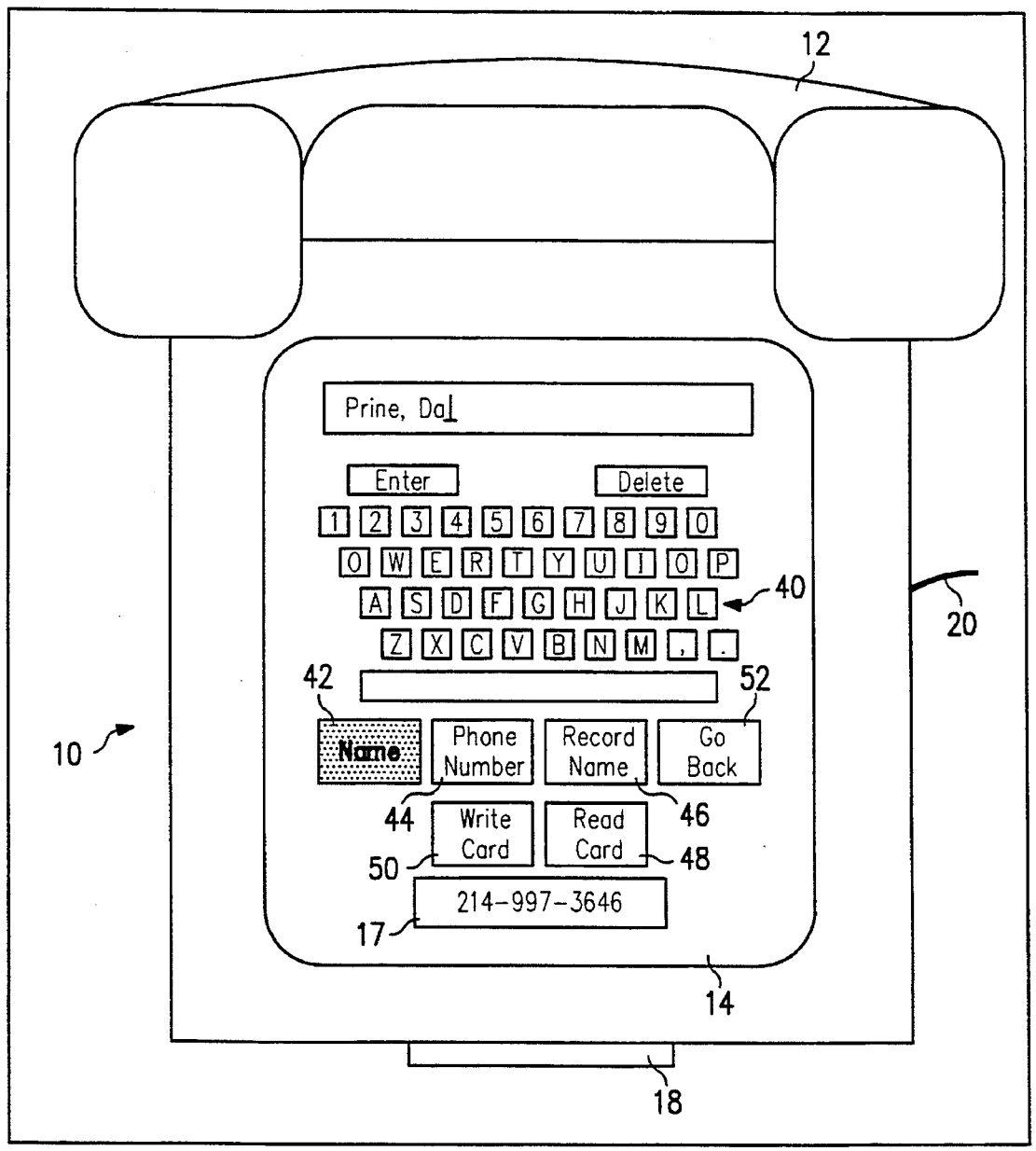
FIG. 2 is a block diagram of a network and switch environment.

When the user touches either region 28a ("Add Name") or region 28b ("Change Name"), the display of screen 14 changes to that shown in FIG. 1c. As shown in FIG. 1c, screen 14 includes a region, indicated generally at 40, displaying a typewriter-like keyboard.

If the user touches a region 42 ("Name") of screen 14, the user can use region 40 to enter a new name into telephone 10, or to edit the name earlier highlighted in region 22 when the user touched region 28b ("Change Name") of FIG. 1b.

If the user touches a region 44 ("Phone Number"), the user can use region 40 to enter a new telephone number into telephone 10, or to edit the telephone number earlier highlighted in region 22 when the user touched region 28b ("Change Name") of FIG. 1b.

If the user touches a region 46 ("Record Name"), telephone 10 records a phrase orally stated by the user into handset 12. As directed by the user, telephone 10 associates the recorded phrase with a stored telephone number. When the user subsequently engages in "spoken speed dialing", the user can specify the stored telephone number by orally restating the phrase into handset 12.

Telephone 10 is able to read and write stored information to removable memory card 18. The stored information includes directory structure and voice templates. Accordingly, if the user touches a region 48 ("Read Card"), telephone 10 reads and stores information from removable memory card 18. Similarly, if the user touches a region 50 ("Write Card"), telephone 10 writes its stored information to removable memory card 18. Then, memory card 18 can be removed from telephone 10 and reinserted into a different telephone in order to transfer the stored information.

When the user touches a region 52 ("Go Back"), the display of screen 14 returns to that shown in FIG. 1b. Such a "directory" application, as discussed hereinabove in connection with FIGS. 1a–c, is only one example of many functions performable by telephone 10. Users can program various other types of functions to be performed by telephone 10, with each programmed function having an associated user-defined region displayed on screen 14.

FIG. 2 is a block diagram of a network and switch environment ("telephone environment"), indicated generally at 60, including a switch 62 and a network 64. Switch 62 and network 64 are included within a commercial telephone service company system, but alternatively can be included within a Private Branch Exchange ("PBX"). Environment 60 interacts with one or more telephones, such as telephone 10 of FIGS. 1a–c.

As shown in FIG. 2, switch 62 is connected to telephone 10 through network line 20, to a telephone 66 through a network line 68, and to a telephone 70 through a network line 70. Accordingly, telephones 10, 66 and 70 are coupled through switch 62 to network 64. Similar to telephone 10, each of telephones 66 and 70 includes respective memory card circuitry for reading and writing to removable memory cards 18, 74 and 76. Any of memory cards 18, 74 and 76, are insertable into any of telephones 10, 66 and 70. The system of the preferred embodiment includes the interconnected combination of environment 60, and at least one of telephones 10, 66 and 70.

Telephone 10 is representative of telephones 66 and 70. In a significant aspect of the preferred embodiment, telephone 10 is configurable to match the capabilities and limitations of environment 60. Accordingly, telephone 10 advantageously adapts to the capabilities and limitations of environment 60 in order to achieve substantially optimal functionality.

The base capabilities of telephone 10 are supported by information stored in a memory of telephone 10, together with information stored on memory cards 18, 74 and 76. If telephone 10 lacks a priori knowledge of environment 60, then telephone 10 is subject to complete or partial reconfiguration upon (1) insertion or removal of a memory card into telephone 10 or (2) initial connection or reconnection of telephone 10 to switch 62. Telephone 10 detects such situations and self-initiates its reconfiguration. Although telephone 10 is also subject to reconfiguration upon a power-on cycle of telephone 10, telephone 10 preferably memorizes its configuration between power-on cycles.

Moreover, telephone 10 is subject to reconfiguration upon initial programming or reprogramming of switch 62 or of network 64, so that telephone 10 effectively adapts to the service mix of capabilities and limitations of environment 60. Environment 60 (including switch 62 and network 64) initiates the reconfiguration of telephone 10 by notifying telephone 10 in the event of such programming.

Although telephone 10 is comprehensively programmable, environment 60 provides only limited services that can be offered through telephone 10. This limitation is a function of network/switch hardware and of switch software. Moreover, even if environment 60 provides a particular service, environment 60 might not authorize telephone 10 to access the particular service. Services offered through telephone 10 might also be limited by a lack of standardized procedures for accessing the services of environment 60, such as where the procedures vary according to different telephone service vendors.

If standardized procedures are available, such procedures are used in the system of the preferred embodiment for communicating between telephone 10 and environment 60. Using such standardized procedures, telephone 10 electronically exchanges capability profile information with environment 60 (including switch 62 and network 64) for establishing available services. Such an exchange of information can be initiated either by telephone 10 or by environment 60. After exchanging capability profile information, telephone 10 stores the established capability profile. In situations discussed hereinabove where telephone 10 is subject to reconfiguration, telephone 10 again exchanges capability profile information with environment 60 in order to update the stored capability profile.

Moreover, if standardized procedures are available for communicating between telephones 10, 66 and 70, then for example telephone 66 can communicate information to telephone 10 for display on screen 14. In response to such information displayed on screen 14 of telephone 10, the user can touch one or more defined regions of screen 14 in order to communicate information to telephone 66. Such an exchange of information can occur between telephone 10 and any other type of device connected to switch 62. For example, network line 72 can be connected to a computer instead of telephone 70.

If standardized procedures are not available for accessing the services of environment 60 according to different telephone service vendors or switch hardware/software vendors, then the system of the preferred embodiment supports user-interactive procedures in which the user specifies the vendor to telephone 10. After learning of the specified vendor, telephone 10 reads information either from its own memory or from memory card 18, in order to determine vendor-specific procedures and capability profile information for establishing available services. If the vendor changes, then the user specifies the new vendor to telephone 10. If the vendor-specific procedures change, or if the vendor's capability profile information changes, then the user either updates the memory of telephone 10 or inserts an updated version of memory card 18.

Although the system of the preferred embodiment supports user-interactive procedures, such user-interactive procedures slightly inconvenience the user and therefore are not preferred. Significantly, vendor-independent techniques are advantageously used in the system of the preferred embodiment for communicating between telephone 10 and environment 60. According to such vendor-independent techniques of the preferred embodiment, it is unnecessary for the user to specify information to telephone 10 concerning vendors, vendor-specific procedures, or capability profile information.

Using vendor-independent techniques of the preferred embodiment, telephone 10 electronically "explores" environment 60 to determine capability profile information for establishing available services. Telephone 10 performs such a determination in situations discussed hereinabove where telephone 10 self-initiates its reconfiguration. After determining capability profile information, telephone 10 stores the established capability profile. In situations discussed hereinabove where telephone 10 self-initiates its reconfiguration, telephone 10 again electronically "explores" environment 60 in order to update the stored capability profile.

Figure 3:
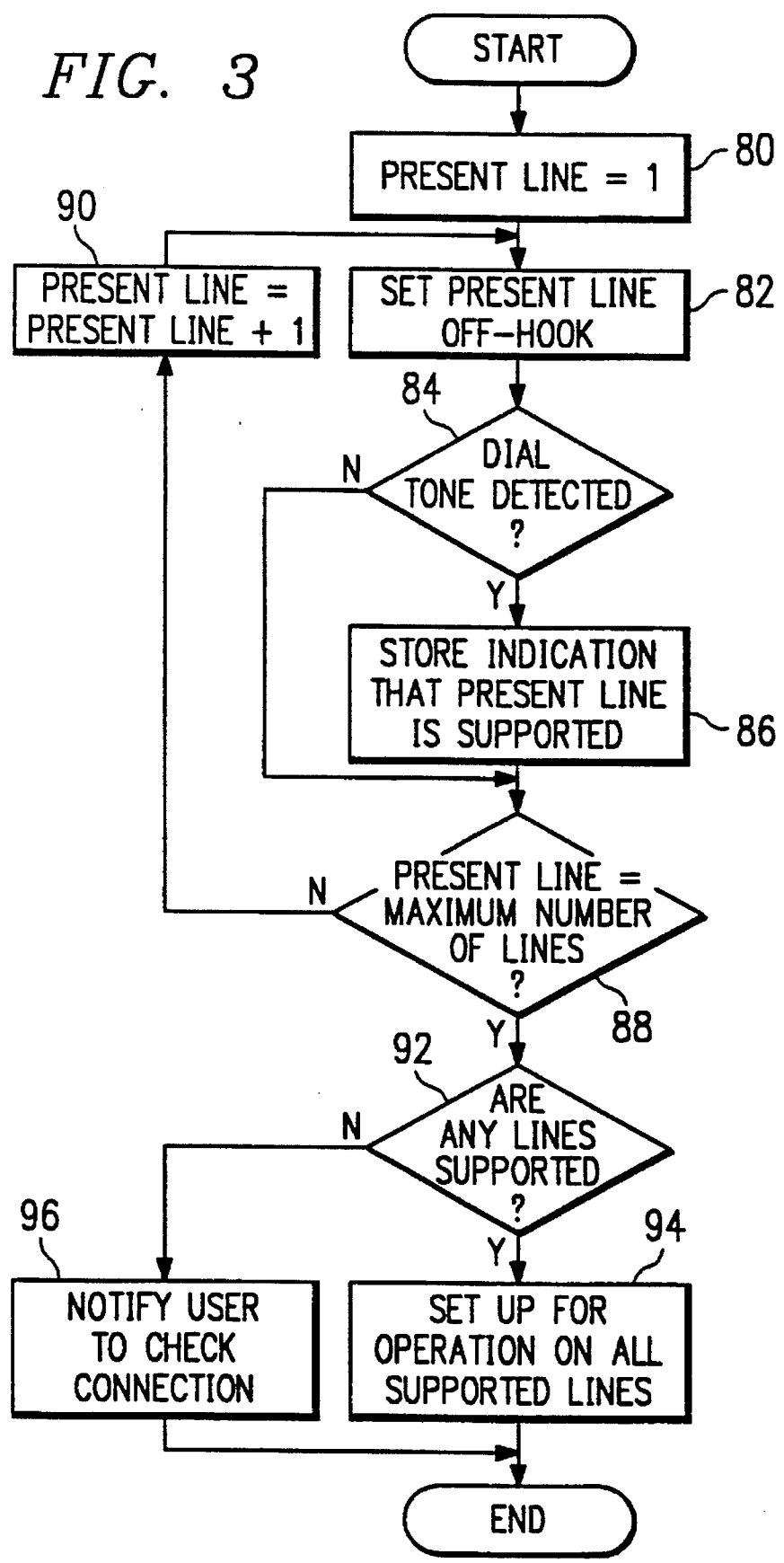
FIG. 3 is a flow chart of a first technique for determining capability profile information of a network and switch environment, according to the preferred embodiment.

FIG. 3 is a flow chart of a first technique of telephone 10 for determining capability profile information, according to the preferred embodiment. Telephone 10 has a maximum number of lines that are supportable by a connection to environment 60. According to the technique of FIG. 3, telephone 10 determines which of its maximum number of lines are actually supported by the connection to environment 60.

Execution begins at a step 80, where telephone 10 initializes a present line to be line #1. At step 82, telephone 10 sets the present line off-hook. At decision block 84, telephone 10 determines whether a dial tone is detected in response to the present line being off-hook. If a dial tone is detected, then at step 86 telephone 10 stores an indication that the present line is supported by the connection to environment 60. Execution then continues to decision block 88.

If a dial tone is not detected at decision block 84, then at decision block 88 telephone 10 determines whether the present line equals the maximum number of lines supportable by a connection to environment 60. If not, then step 90 increments the present line number, and execution returns to step 82.

If at decision block 88 telephone 10 determines that the present line equals the maximum number of lines, then decision block 92 determines whether any lines are supported by the connection to environment 60 (in response to the indications stored at step 86). If yes, then at step 94 telephone 10 sets up for operation on all the supported lines, such that screen 14 of telephone 10 displays for each supported line an associated region (e.g. a region labelled as "Line #3") for the user to touch in order to select the supported line. If no lines are supported by the connection to environment 60, then at step 96 telephone 10 notifies the user to check the connection to environment 60.

Figure 4:
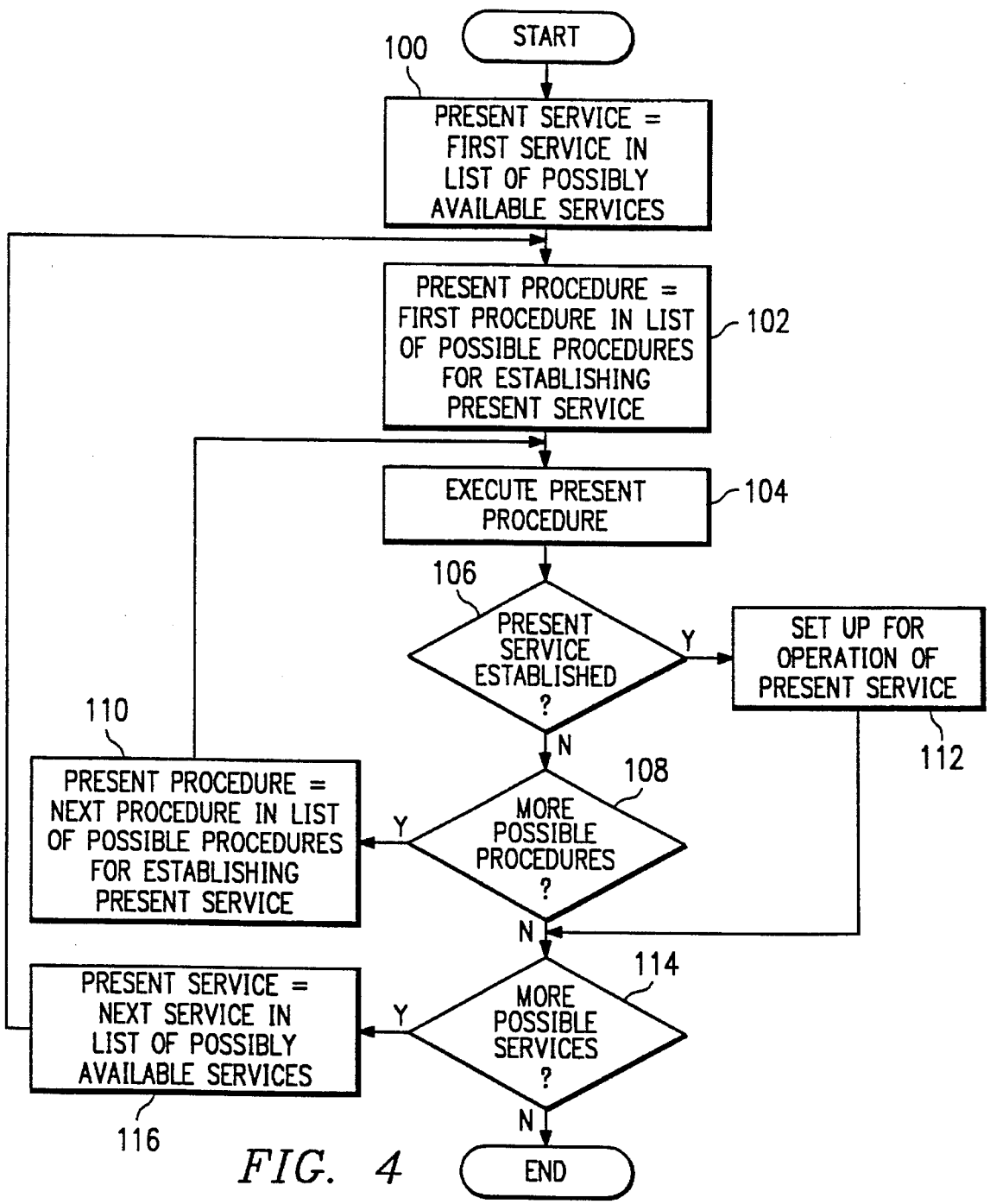
FIG. 4 is a flow chart of a second technique for determining capability profile information of a network and switch environment, according to the preferred embodiment.

FIG. 4 is a flow chart of a second technique of telephone 10 for determining capability profile information, according to the preferred embodiment. Telephone 10 comprehensively determines capability profile information by using the technique of FIG. 4 together with the technique of FIG. 3. For determining capability profile information, telephone 10 stores (1) a list of services possibly offered through environment 60 and (2) a list of candidate procedures for establishing each listed service.

For example, the list of offerable services includes camp-on, call forwarding, transfer, conference calls, call waiting, and call pickup. In the list of candidate procedures, telephone 10 is programmed to test a variety of control standards appropriate for different PBX manufacturers and different service vendors. For example, one vendor might support the camp-on service in response to receiving the command sequence FLASH#1 from telephone 10. Another vendor might require a different command sequence. Moreover, network responses to such command sequences might vary from one vendor to another. Advantageously, telephone 10 is programmed to support a wide range of expected interface standards.

Using the stored lists (i.e., list of offerable services, and list of candidate procedures), telephone 10 determines capability profile information by sequentially attempting to establish each possibly available service through environment 60, and by then monitoring the response through environment 60 to determine whether the service is supported by the connection to environment 60.

Accordingly in FIG. 4, execution begins at a step 100, where telephone 10 initializes a present service to be the first service in the list of possibly available services. At step 102, telephone 10 initializes a present procedure to be the first procedure in the list of possible procedures for establishing the present service. At step 104, telephone 10 communicates with environment 60 in order to execute the present procedure.

At decision block 106, telephone 10 determines whether the present service is established. For example, telephone 10 is able to monitor network line 20 either (1) for a fast busy response from environment 60 indicating that the service is not available) or (2) for a recorded announcement indicating that the service is available. For a service involving multiple lines (such as camp-on, call forwarding, transfer, conference calls, call waiting, and call pickup), telephone 10 tests the service's functionality at decision block 106 in order to determine whether the service is properly established.

Accordingly, if telephone 10 has a requisite number of lines supported by the connection to environment 60, then telephone 10 autonomously tests the service's functionality at decision block 106. For example, in testing the functionality of camp-on service, telephone 10 sets its own Line #1 off-hook. Then, telephone 10 uses its own Line #2 to automatically call its own Line #1. In response to the busy signal resulting from Line #1 being off-hook, telephone 10 returns Line #2 to on-hook. Telephone 10 then returns Line #1 to on-hook. After returning Line #1 to on-hook, telephone 10 determines whether camp-on service is functional by monitoring whether environment 60 rings Line #2.

Similarly, in testing the functionality of call waiting service, telephone 10 uses its own Line #2 to automatically call its own Line #1. Telephone 10 then uses its own Line #3 to automatically call Line #1. After using Line #3 to call Line #1, telephone 10 determines whether call waiting service is functional by monitoring whether environment 60 provides a call waiting indication to Line #1. Telephone 10 likewise uses three lines to autonomously test the functionality of other services such as call forwarding, transfer, conference calls, and call pickup.

If telephone 10 does not have the requisite number of lines for autonomously testing a particular service's functionality, then telephone 10 communicates with one or more other telephones (such as telephones 66 and 70 of FIG. 2) in order to test the particular service's functionality at decision block 106. For example, if telephone 10 has a line (Line #1), if telephone 66 has a line (Line #2), and if telephone 70 has a line (Line #3), then telephones 10, 66 and 70, together are sufficient to test the functionality of call waiting service within environment 60. In this example, telephone 10 (Line #1) automatically calls telephone 66 (Line #2). In response to a command sequence from telephone 10, telephone 66 starts an internal timer. The command sequence notifies telephone 66 concerning the type of service being tested. After disconnecting from telephone 66, telephone 10 (Line #1) automatically calls telephone 70 (Line #3). In response to a command sequence from telephone 10, telephone 70 starts an internal timer which is set to expire after the internal timer of telephone 66 expires. Telephone 10 then disconnects from telephone 70.

After the internal timer of telephone 66 expires, telephone 66 (Line #2) automatically calls telephone 10 (Line #1). Later, after the internal timer of telephone 70 expires, telephone 70 (Line #3) automatically calls telephone 10 (Line #1). Since telephone 10 knows when the internal timer of telephone 70 is set to expire (and therefore when telephone 70 is set to call telephone 10), telephone 10 (Line #1) determines whether call waiting service is functional by monitoring whether environment 60 provides a call waiting indication after the internal timer of telephone 70 is set to expire. Telephone 10 likewise coordinates with telephones 66 and 70 to test the functionality of other services such as call forwarding, transfer, conference calls, call pickup, and camp-on.

If telephone 10 determines at decision block 106 that the present service is not established, then telephone 10 determines at decision block 108 whether more procedures are included in the list of possible procedures. If more procedures are included, then at step 110 telephone 10 sets the present procedure to be the next procedure in the list of possible procedures. Execution then returns to step 104.

If telephone 10 determines at decision block 106 that the present service is established, then at step 112 telephone 10 sets up for operation of the present service, such that screen 14 of telephone 10 displays for the present service an associated region (e.g. a region labelled as "Camp-On") for the user to touch in order to select the present service. Execution then continues to decision block 114.

If telephone 10 determines at decision block 108 that more procedures are not included in the list of possible procedures, then telephone 10 determines at decision block 114 whether more services are included in the list of possibly available services. If yes, then at step 116 telephone 10 sets the present service to be the next service in the list of possibly available services. Execution then returns to step 102. If telephone 10 determines at decision block 114 that more services are not included in the list of possibly available services, then execution ends.

Accordingly, telephone 10 uses the technique of FIG. 4 to determine availability of specific network features such as CLASS or CENTREX services. Although such a service is supportable in response to a user-specified command sequence (e.g. "*60"), telephone 10 simplifies the user interface by displaying a region (e.g. a region labelled as "Call Block") on screen 14 for the user to touch in order to select the service.

Although the present invention and its advantages have been described in detail, it should be understood that various changes, substitutions and alterations can be made herein without departing from the spirit and scope of the invention as defined by the appended claims.

What is claimed is:

1. A method of configuring a programmable telephone, comprising the steps of:

providing said programmable telephone with a speech recognition unit;

forming a connection between said programmable telephone and a telephone environment;

generating a list of a plurality of services offerable through said telephone environment;

generating a list of a plurality of candidate procedures for establishing each of said plurality of services through said telephone environment;

executing at least one of said plurality of candidate procedures for establishing each of said plurality of services to determine whether said each of said plurality of services is supported by said connection to generate a supported service;

displaying a representation of said supported service on a screen of said programmable telephone;

recording a phrase stated by said user into a handset of said programmable telephone using said speech recognition unit;

associating said recorded phrase with said supported service; and performing said supported service associated with said recorded phrase in response to a user orally restating said phrase into said handset of said programmable telephone.

2. The method of claim 1, further including the steps of:

programming a function into said programmable telephone;

associating said programmed function with a region on said screen of said programmable telephone; and performing said function associated with said region in response to a user selecting said region on said screen of said programmable telephone.

3. The method of claim 2, wherein said programming step includes the step of programming said programmable telephone to display a previous screen of said programmable telephone.

4. The method of claim 2, wherein said programming step includes the step of programming said programmable telephone to store said programmed function to a removable memory card.

5. The method of claim 2, wherein said programming step includes the step of programming said programmable telephone to retrieve said programmed function from a removable memory card.

6. The method of claim 2, wherein said programming step includes the step of programming said programmable telephone to perform said recording step.

7. The method of claim 2, wherein said programming step includes the steps of:

displaying a list of stored names and associated telephone numbers in a directory region on said screen of said programmable telephone;

highlighting one of said stored names and associated telephone numbers in response to a user selecting said one of said stored names and associated telephone numbers;

allowing said user to change said highlighted one of said stored names and associated telephone numbers in response to said user selecting a change name region on said screen of said programmable telephone;

allowing said user to delete said highlighted one of said stored names and associated telephone numbers in response to said user selecting an erase name region on said screen of said programmable telephone;

allowing said user to add a new name and associated telephone number to said list in response to said user selecting an add name region on said screen of said programmable telephone;

dialing said associated telephone number in response to said user selecting a dial region on said screen of said programmable telephone; and updating said display of said list of names and associated telephone numbers in response to said user selecting one of a scroll up region, a scroll down region and a character region.

* * * * *